(12) United States Patent
Ehrman et al.

(10) Patent No.: US 6,860,285 B2
(45) Date of Patent: Mar. 1, 2005

(54) LIQUID FUEL TRAP (75) Inventors: Moshe Ehrman, Haluutza (IL); Ehud Orenstein, Halutza (IL); Zohar Moalem, Halutza (IL); Vladimir Olshanetsky, Beer Sheva (IL); Alexey Zarochintsev, Beer Sheva (IL)

(73) Assignee: Raval-Agriculture Cooperative Societies, Ltd., Halutza (IL)

( * ) Notice: Subject to any disclaimer, the term of this patent is extended or adjusted under 35 U.S.C. 154(b) by 0 days.

(21) Appl. No.: 10/241,532

(22) Filed: Sep. 12, 2002

(65) Prior Publication Data

US 2003/0079775 A1 May 1, 2003

Related U.S. Application Data (63) Continuation-in-part of application No. PCT/IL02/00110, filed on Feb. 13, 2002, which is a continuation-in-part of application No. 09/795,365, filed on Mar. 1, 2001, now Pat. No. 6,557,581.

(51) Int. Cl.[7] .............................................. F16K 24/04
(52) U.S. Cl. ............................ 137/38; 137/43; 137/45; 137/202; 137/587
(58) Field of Search ............................ 137/43, 202, 38, 137/45, 587

(56) References Cited

U.S. PATENT DOCUMENTS

| | | | |
|---|---|---|---|
| 3,614,960 A | 10/1971 | Pfrengle | |
| 4,646,772 A | 3/1987 | Bergsma | |
| 4,989,629 A | 2/1991 | Shirakawa | |
| 5,277,217 A | 1/1994 | Kobayashi et al. | |
| 6,062,250 A | 5/2000 | Takahashi | |
| 6,336,466 B1 | 1/2002 | Ganachaud et al. | |
| 6,405,747 B1 | 6/2002 | King et al. | |
| 6,425,379 B2 | 7/2002 | Shimamura et al. | |
| 6,520,200 B1 * | 2/2003 | Lawrukovich et al. | 137/202 |
| 6,532,983 B2 * | 3/2003 | Ganachaud | 137/43 |
| 6,557,581 B2 * | 5/2003 | Ehrman et al. | 137/202 |
| 6,604,539 B1 * | 8/2003 | Strohmayer et al. | 137/202 |
| 6,655,403 B2 * | 12/2003 | Mills | 137/202 |
| 2002/0083974 A1 * | 7/2002 | Duermeier et al. | 137/202 |

FOREIGN PATENT DOCUMENTS

| | | |
|---|---|---|
| DE | 34 17 507 A1 | 11/1985 |
| DE | 199 25 728 A1 | 12/2000 |
| FR | 2 774 948 A1 | 8/1999 |
| GB | 2 269 375 | 2/1994 |
| JP | 4-185534 | 7/1992 |
| WO | WO 01/07806 A1 | 2/2001 |

* cited by examiner

Primary Examiner—Gerald A. Michalsky
(74) Attorney, Agent, or Firm—Birch, Stewart, Kolasch & Birch, LLP.

(57) ABSTRACT

A liquid fuel trap device for a vehicle fuel tank, comprising a housing formed with a confined space with at least one inlet port connectable to a corresponding fuel valve, an outlet port connectable to a fuel vapor recovery system, and a liquid fuel discharge valve adapted for discharging liquid fuel from the confined space into the tank. The housing further comprises a connecting arrangement for attaching the device on an inner surface of an upper wall of the fuel tank.

55 Claims, 12 Drawing Sheets

LIQUID FUEL TRAP

CROSS REFERENCE TO RELATED REFERENCES

This application is a Continuation-In-Part of copending PCT International Application No. PCT/IL02/00110 filed on Feb. 13, 2002, which designated the United States and on which priority is claimed under 35 U.S.C. § 120, the entire contents of which are hereby incoporated by reference.

The present invention is a Continuation-In-Part of U.S. patent application Ser. No. 09/795,365 filed Mar. 1, 2001 now U.S. Pat. No. 6,557,581.

FIELD OF THE INVENTION

The present invention is in the field of vehicle fuel systems and more specifically it is concerned with a liquid fuel trap (at times referred to also as an expansion tank or an expansion canister).

BACKGROUND OF THE INVENTION

Vehicle fuel systems comprise, among other items, a fuel tank fitted with a filler neck, a variety of fuel valves, a tubing for supplying fuel to the ignition system and a fuel vapor treating system (typically a carbon filter recovery system-canister) to which fuel vapor from the fuel tank flows and is then used for enriching the fuel mixture fed to the ignition system.

Fuel fluid (in the form of liquid, droplets, spray and vapor) from the fuel tank flows via the one or more valves, which are connected via suitable tubing, to a liquid trap intermediate the fuel vapor recovery system and the tank.

The liquid trap receives fuel fluid flowing from the fuel tank which flows at a relatively high velocity owing to pressure and temperature changes, and thus vapor flowing from the fuel tank carries along with it also a considerable amount of liquid fuel in the form of droplets (as a result of a venturi effect). The liquid trap entraps the liquid fuel and allows fuel vapor flow towards the vapor recovery system. The liquid fuel then returns back to the fuel tank, upon pressure decrease within the fuel tank.

A liquid fuel trap is important in those cases where the various valves fitted within the tank are internally installed, i.e. do not project from an upper wall of the tank, where siphons may be generated at tubes connecting the valves to the liquid trap. Such siphons interfere with venting the tank on the one hand and, on the other hand, interfere with draining of the devices.

Still another problem occurring with liquid fuel traps is that the pressure within the fuel tank decreases toward the canister owing to head loss over the different valving and tubing and where the canister outlet is at atmospheric pressure. Accordingly, in some instances, a fuel trap may in fact drag liquid droplets from the fuel tank towards the canister owing to motion of the fuel within the fuel tank of a vehicle resulting in temperature increase, pressure increase and generation of vapor or droplets which may enter the liquid trap and flow toward the canister.

It is an object of the present invention to provide a liquid fuel trap for a vehicle's fuel system, in which the expansion chamber is made of a plastic material and is adapted for fitting within the fuel tank.

It is a primary object of the invention to provide such a liquid trap wherein liquid is prevented from flowing into the expansion tank thereof to thereby prevent liquid flow toward the canister.

SUMMARY OF THE INVENTION

The present invention calls for a liquid fuel trap usable in a vehicle's fuel system, which liquid trap is adapted for fitting within the fuel tank and comprises a relief valve for spontaneously discharging liquid fuel into the fuel tank, when the pressure with the tank drops below a predetermined threshold.

In accordance with some particular embodiments of the present invention, the liquid fuel trap further comprises dynamic valve means to prevent fluid flow from the fuel tank into the liquid trap.

In accordance with still another embodiment of the invention the liquid fuel trap is provided with an intermediate chamber fitted with a sealable inlet port and a sealable outlet port, said ports being selectively displaceable between closed and open positions, respectively so as to discharge liquid from the fuel trap into said intermediate chamber and out to the fuel tank, though prevent flow in the direction from the fuel tank into said fuel trap.

According to the present invention there is provided a liquid fuel trap device for a vehicle fuel tank, the device comprising a housing formed with a confined space with at least one inlet port connectable to a corresponding at least one fuel valve, an outlet port connectable to a fuel vapor recovery system, and a liquid fuel discharge valve adapted for discharging liquid fuel from said space into the tank, the housing further comprising a connecting arrangement for attaching the device on an inner surface of an upper wall of the fuel tank.

The liquid fuel trap device is typically made of an essentially impermeable material, though since the device is fitted for mounting within the fuel tank, this feature is not essential.

According to one particular embodiment, the confined space of the housing comprises at least a well portion, said well portion being lowest within the confined space, where the liquid discharge valve is a check valve fitted at a bottom most portion thereof.

The liquid discharge valve, according to one design, is a mushroom-type valve, and by another design is a spring-biased valve, such as, for example, a door-type valve, or a seat-type check valve.

According to an embodiment of the invention, liquid flow from the at least one inlet port is prevented from direct flowing or splashing to the outlet port. By one specific design there is a barrier member between the at least one inlet port and the outlet port. This effect may also be achieved by designing the at least one inlet port and the outlet port at different levels and axially diverted, i.e. not axially extending. Thus, the confined space may be formed with several unleveled chambers, where the inlet and outlet ports are fitted at different levels.

The device, according to one design, is attached to the fuel tank by a securing member formed on the housing and adapted for snap engagement with a connection extending from the upper wall of the fuel tank.

The present invention calls also for a fuel system comprising a fuel tank, at least one fuel valve, a fuel recovery device and a liquid fuel trap device extending between the at least one fuel valve and the liquid trap device, said liquid trap device comprising a housing formed with a confined space with at least one inlet port connectable to the corresponding at least one fuel valve, an outlet port connectable to the fuel vapor recovery system, a liquid fuel discharge valve adapted for discharging liquid fuel from said space into the tank, and a connecting arrangement for attaching the device on an inner surface of an upper wall of the fuel tank.

According to a specific design, the device is attached to the fuel tank by a connecting member extending from the upper wall of the fuel tank, said connecting member adapted for snap-engagement with a corresponding securing member formed on the housing of the device.

BRIEF DESCRIPTION OF THE DRAWINGS

In order to better understand the invention and to see how it may be carried out in practice, reference will now be made to the accompanying drawings, by way of example only, in which.

DETAILED DESCRIPTION OF THE INVENTION

Whilst some embodiments have been described and illustrated with reference to some drawings, the artisan will appreciate that many variations are possible which do not depart from the general scope of the invention, mutatis, mutandis.

Figure 1:
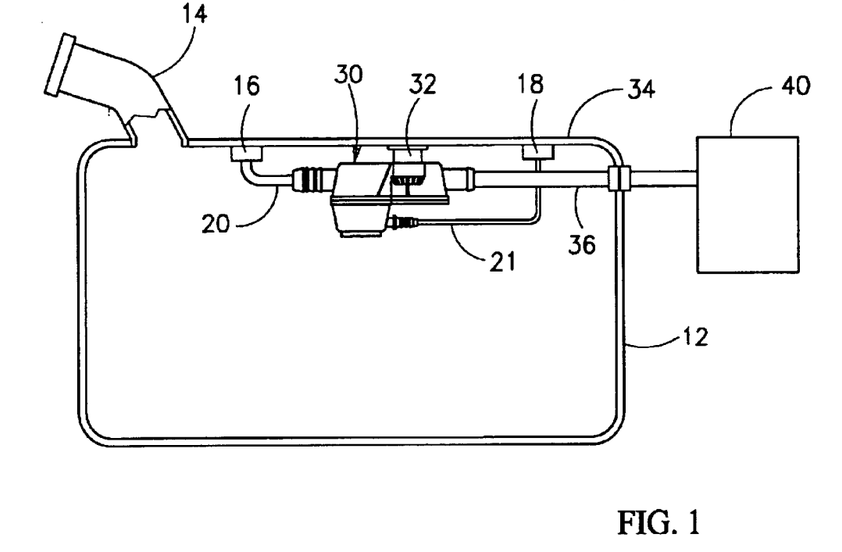
FIG. 1 is a schematic representation illustrating a fuel system fitted with a liquid fuel trap according to the present invention.

FIG. 1 is a schematic illustration of a vehicle's fuel system generally is designated 10 comprising several elements which are schematically illustrated, namely a fuel tank 12 fitted with a fueling pipe 14, several valves 16 and 18, e.g. a roll-over valve, over-filling interdiction valve and a variety of other valves are possible, as known per se. The valves 16 and 18 are connected via suitable tubing 20 and 21 to a liquid fuel trap device in accordance with the present invention generally designated 30 connected at a cylindrical stem member 32 to an inside surface of an upper wall 34 of the fuel tank 12. It is desired to avoid formation of siphons in the tubes extending to and from the device, as such siphons interfere with venting the tank on the one hand and, on the other hand, interfere with draining the devices.

Extending from the liquid fuel trap 30 there is a pipe 36 extending to a fuel vapor recovery system 40, typically a carbon fuel treating device known as "a canister".

Figure 2:
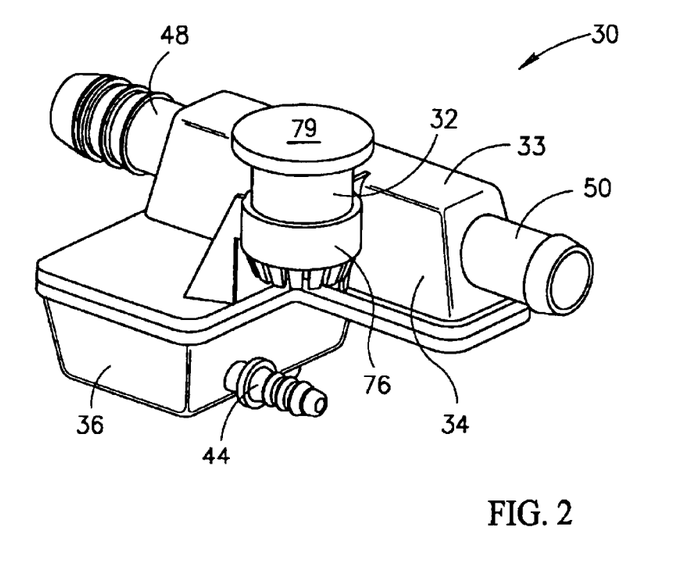
FIG. 2 is an isometric view of the liquid trap in accordance with the invention.
Figure 3:
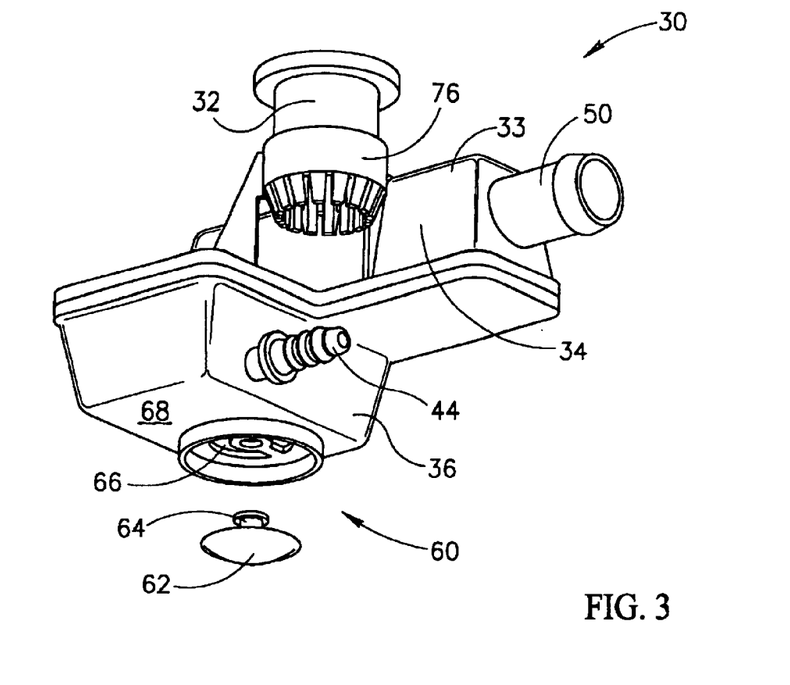
FIG. 3 is a bottom isometric view of the device seen in FIG. 2, partially exploded so as to visualize a discharge valve thereof.
Figure 4:
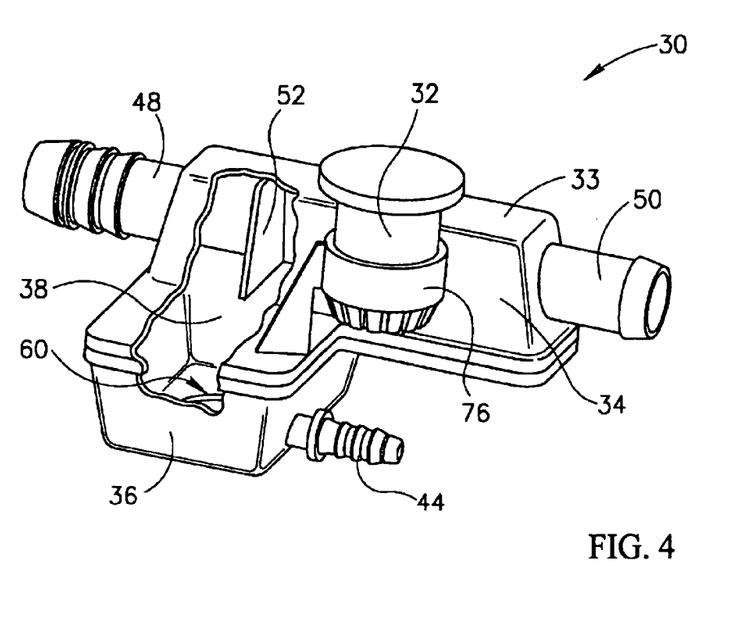
FIG. 4 is an isometric view of the liquid trap in accordance with the invention, partially sectioned so as to visualize a barrier wall in the confined space.

Further reference is now made to FIGS. 2 to 4 for understanding the specific construction of the liquid fuel trap device 30 in accordance with the present invention. The device 30 comprises a housing 33 formed with an upper chamber 34 and a well-like lower chamber 36 which together defined a confined space 38 (FIG. 4). The lower chamber 36 is fitted with an inlet nipple 44 constituting a first inlet port connected by tube 21 to valve 18 (see FIG. 1) and the upper chamber 34 is fitted with a second inlet nipple 48 constituting a second inlet port connectable via tube 20 to valve 16 (see FIG. 1). Connected at an opposite side of the upper chamber 34 there is an outlet nipple 50 connected via tube 36 to the vapor recovery system 40 (see FIG. 1).

As can be seen in FIG. 4, the upper chamber 34 comprises a barrier wall 52 extending opposite the second inlet 48 thus preventing liquid from splashing from the inlet directly towards the outlet 50 and rather forcing it to flow into well-like lower chamber 36 where it will accumulate and discharge into the fuel tank by gravity through a discharge valve 60 and a lowermost portion of the lower chamber 36.

Figure 5:
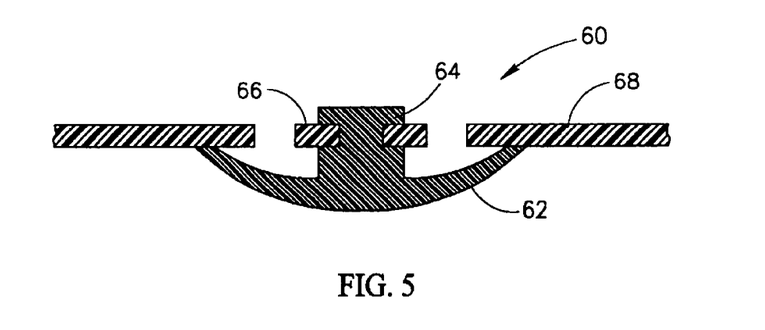
FIG. 5 is a local section of a base portion of the housing of the fuel trap, illustrating a mushroom-type discharge valve.

By one particular embodiment, illustrated in FIGS. 3 and 5, the discharge valve 60 is a one-way mushroom-type valve comprising a flexible mushroom-like diaphragm member 62 formed with a stem portion 64 snapingly received within a suitable receptacle 66 at a bottom wall 68 of the lower chamber 36. Liquid accumulating above the flexible diaphragm will eventually cause it to deform and discharge the liquid into the fuel tank 12.

Figure 6:
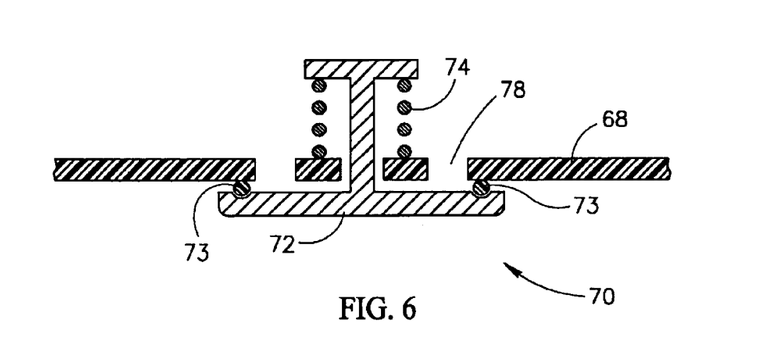
FIG. 6 is a local section of a base portion of the housing of the fuel trap, illustrating a spring biased type discharge valve.

Another embodiment of a discharge valve is illustrated in FIG. 6 wherein the bottom wall 68 of the lower chamber 36 accommodates a one-way valve 70 comprising a closure member 72 biased by coiled spring 74 into sealing engagement with apertures 78 formed in wall 68, with a sealing gasket 73 provided for improved sealing engagement. The closure member 72 will displace to an open position, overcoming the force of coil spring 74 upon accumulation of a predetermined amount of liquid fuel within the chamber 36 and upon decrease of pressure within the fuel tank 12.

Figure 7:
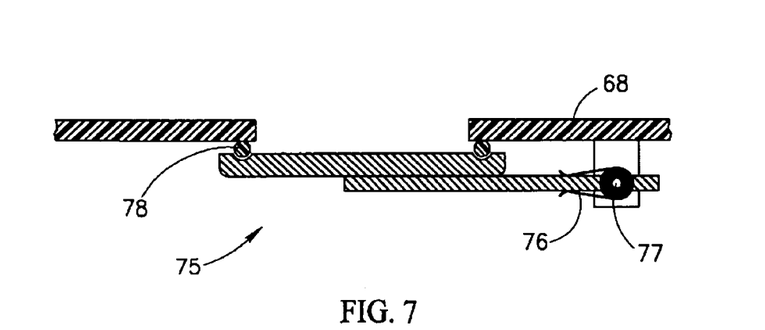
FIG. 7 illustrates still another embodiment of a discharge valve for use in a liquid trap according to the present invention.

The embodiment of FIG. 7 illustrates another option for a discharge valve suitable for use in a liquid trap according to the present invention. The discharge valve is a door-like closure designated 75, pivotally connected at 77 to the bottom wall 68 of the housing of the device and being biased by spring 76 into sealing engagement, there being a gasket seal 78 for improved sealing.

Reverting now to FIGS. 2 to 4, it is noted that the housing 33 of the device 30 comprises a ring-like member 76 integrally formed with the housing 33 and adapted for snap engagement with a cylindrical stem member 32 (see FIG. 1) attached to a top wall surface 34 of fuel tank 12, e.g. by welding surface 79 or by other connecting methods desirably being non-permeable attachment means. Preferably, stem member 32 should be as short as possible, so as to ensure the device 30 is installed as high as possible within the tank 12. However, this is only an embodiment for connecting the device within the tank. Other connecting options are possible too, setting as an example the arrangement disclosed in WO 01/07806.

Figure 8:
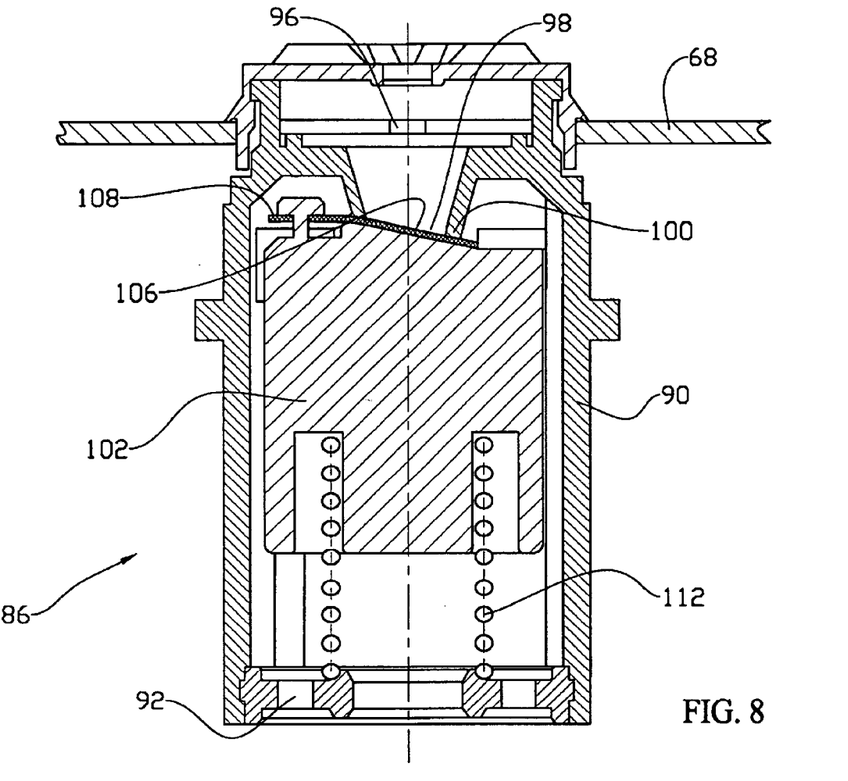
FIG. 8 illustrates a local section of a base portion of the housing of the fuel trap, illustrating a discharge valve in the form of a roll-over valve, the valve in its sealed position.

Turning now to FIG. 8, there is illustrated still a further embodiment of a discharge valve generally designated 86, fitted in an opening formed in the bottom wall 68 of the liquid trap device 30. Discharge valve 86 is in the form of a roll-over valve comprising a cylindrical casing 90 having a fluid inlet 92 being in flow communication with the inside of the fuel tank 12, and a fluid outlet 96 in flow communication with the confined space 38 of the fuel trap device 30 (see FIG. 4). The fluid outlet 96 comprises a substantially elongated slit-like outlet aperture 98 bounded by a valve seating 100. A float member 102 is axially displaceable within casing 90 and is formed with an elongate flexible closure membrane strip 106 anchored at one end thereof 108 to an end of the float member 102, adjacent the outlet 98, with a portion thereof being offset with respect to the outlet aperture 98. The float member 102 is biased upwardly by means of a coiled spring 112.

The arrangement is such that the coiled spring 112 together with the buoyancy forces acting on float member 102 tend to press the membrane strip 106 into sealing engagement with the outlet aperture 98 whilst gravity forces acting on float member 102 tend to displace it away from the outlet aperture 98, so as to progressively detach the strip 106 from sealing engagement with the aperture.

Distinguished over the previous embodiments, the valve 86 does not close under pressure but rather closes when fuel reaches a critical level where the float 102 sealingly abuts against the valve seating 100. The roll-over valve 86 also seals upon roll-over of the vehicle.

In accordance with the previous embodiments, in some undesired situations, e.g. pressure increase within the fuel tank along with fuel splashing upon sudden acceleration or deceleration of the vehicle, fuel droplets may enter the fuel trap. The following embodiments, depicted in FIGS. 9 to 18, illustrate alternative designs overcoming this situation.

Figure 9:
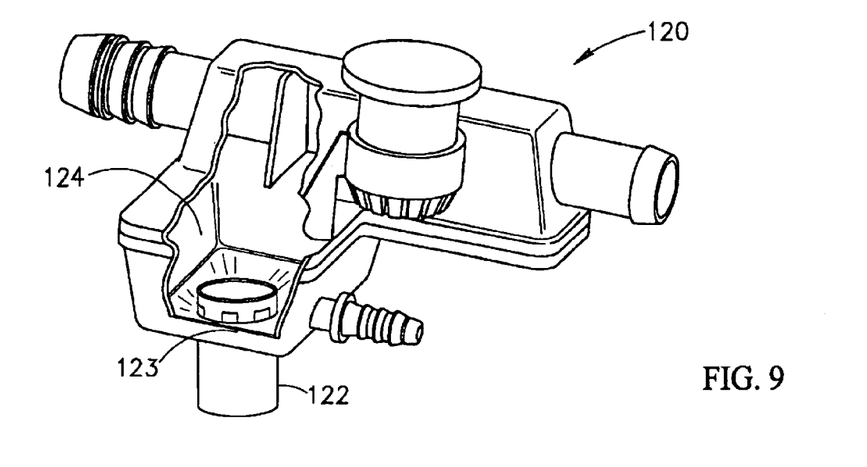
FIG. 9 is a partially cut out isometric view of a liquid trap in accordance with different embodiments of the present invention.

Turning now to FIG. 9, there is illustrated a liquid fuel trap generally designated 120 differing from the previous embodiments in that it is equipped with a discharging outlet 122 extending downwards from an inclined bottom surface 123 of a confined space 124 of the liquid trap 120. Discharging outlet 122 may be one of many embodiments, some of which will be disclosed hereinafter in more detail.

Figure 10A:
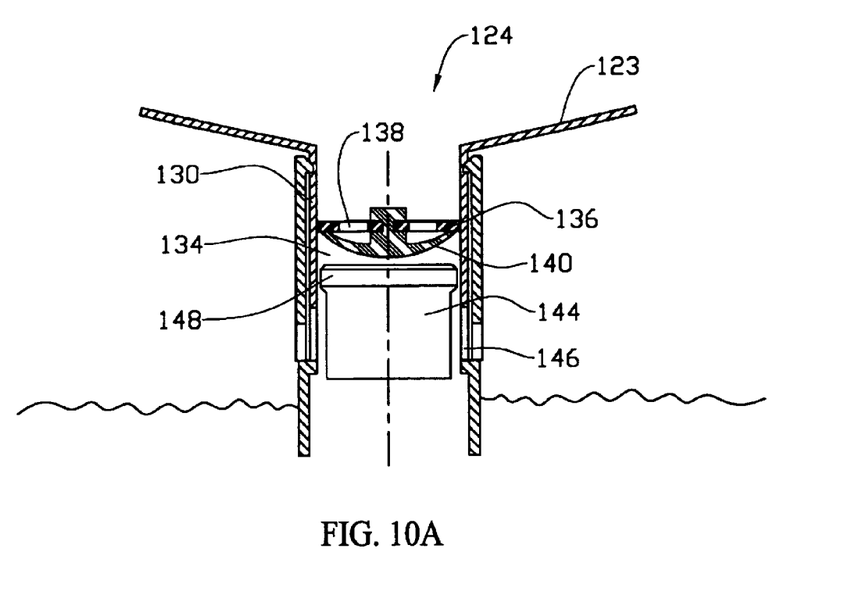
FIGS. 10A and 10B are a longitudinal section through a bottom portion of a discharging outlet in accordance with an alternative embodiment of the invention, in a closed position and an open position, respectively.
Figure 10B:
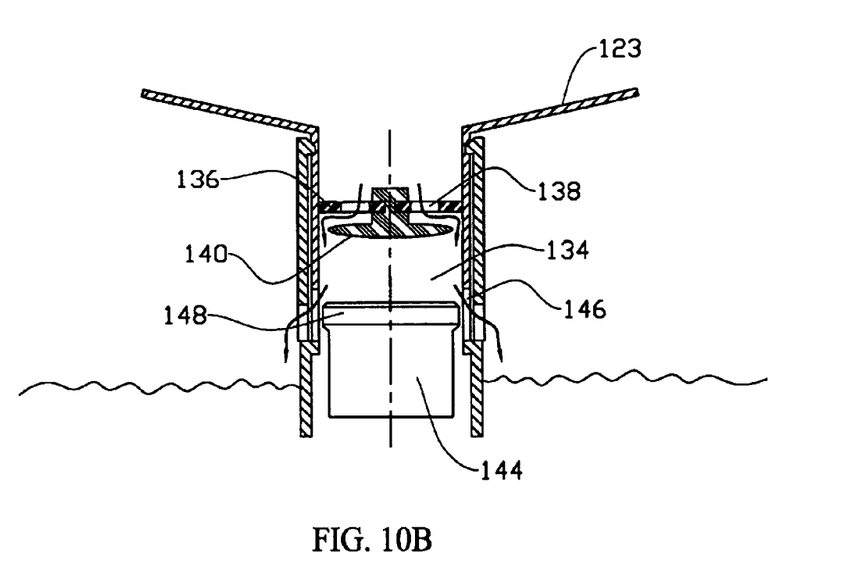

Turning now to FIGS. 10A and 10B, there is illustrated a portion of the bottom surface 123 of the confined space 124 integrally fitted with a downwardly extending tubular cylindrical wall 130 having defined therein an intermediate chamber 134 extending between an upper wall 136 formed with apertures 138 and sealable by means of a mushroom-type valve 140, and further defined by an axially displaceable sealing float member 144. The cylindrical wall 130 is fitted at a lower end thereof with outlet apertures 146 and the float member 144 is displaceable between an upper position (as in FIG. 10A) wherein an upper portion 148 of the float member 144 sealingly bears against the inner walls of the cylindrical wall 130 and a lower position (FIG. 10B) wherein the outlet apertures 146 are exposed and allow discharge of collected fuel droplets from the intermediate chamber 134 into the tank 12.

The arrangement in accordance with the embodiment of FIGS. 10A and 10B is such that fuel in liquid form collects above the partition wall 136. Such liquid fuel is comprised of droplets entering the confined space 124 and fuel vapor that condenses into liquid. When the liquid fuel reaches sufficient weight, the mushroom-type valve 140 will deform to open (FIG. 10B), discharging the liquid fuel into the intermediate chamber 134, upon which the mushroom-type valve will spontaneously close (position of FIG. 10A). As long as the float member 144 is in its upper position (FIG. 10A) the liquid fuel will remain in the intermediate chamber 134. However, upon downward displacement of the float member 144 (as in FIG. 10B), i.e. as a result of waves in the fuel tank, the float member 144 reaches its lowermost position as in FIG. 10B allowing the liquid fuel to discharge into the fuel tank 12 through apertures 146.

This arrangement ensure that fuel vapor and fuel in liquid form does not flow in the direction from the fuel tank towards the canister.

Figure 11A:
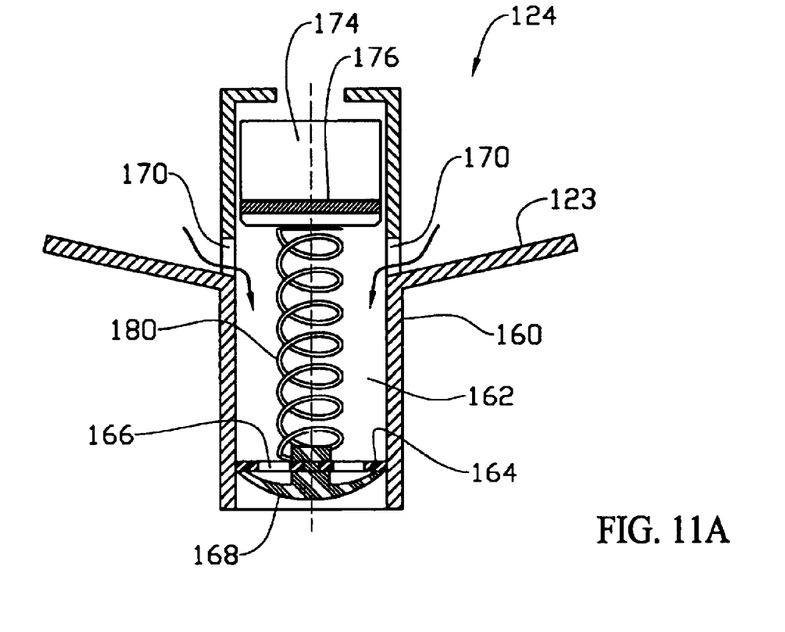
FIGS. 11A and 11B are a longitudinal section through a bottom portion of a discharging outlet in accordance with a different embodiment of the invention, in a closed position and an open position, respectively.
Figure 11B:
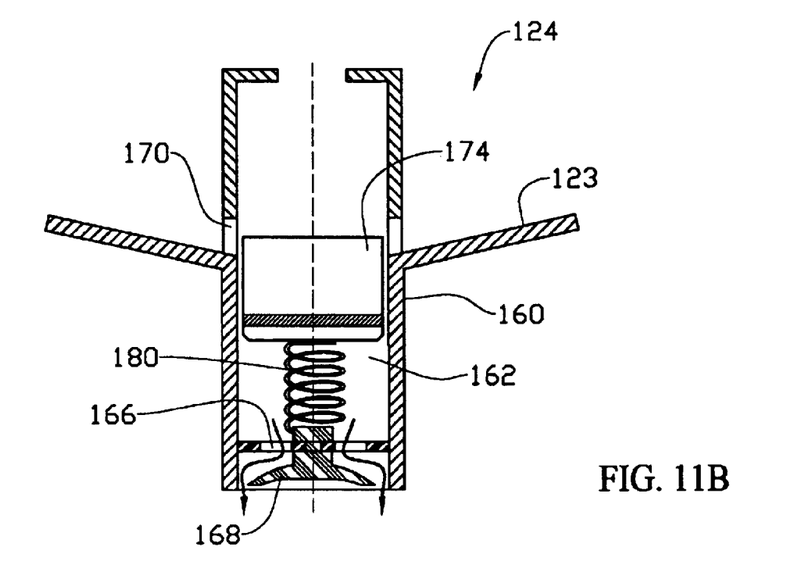

Further attention is now directed to FIGS. 11A and 11B illustrating a modification of the previous embodiment. Similar to the previous embodiment, extending from a lowermost portion of the bottom surface 123 of the confined space 124 there is a cylindric sleeve 160 extending into the fuel tank 12 and having defined therein an intermediate chamber 162. The bottom of intermediate chamber 162 is defined by a lower wall 164 formed with discharge openings 166 and sealable by a normally closed mushroom-type valve 168. At an upper end thereof, above the surface 123, the cylindrical sleeve 160 is fitted with inlet openings 170 communicating between the intermediate chamber 162 and the confined space 124. The intermediate chamber 162 is further defined at its upper end by means of an axially displaceable sealing mass 174 fitted with a sealing ring 176, wherein the sealing mass 174 is displaceable between an upper position as in FIG. 11A where the inlet openings 170 are open to facilitate communication between the intermediate chamber 162 and the confined space 124, and a lower position as in FIG. 11B wherein flow communication between the confined space 124 and the intermediate chamber 162 is prohibited by the sealing mass 174. It is further noted that the sealing mass 174 is supported by a weak biasing coiled spring member 180, the force of which is predetermined to provide suitable force equilibrium of the sealing mass 174.

The arrangement in accordance with the present embodiment is such that the sealing mass 174 bounces up and down between its upper and lower positions as a result of traveling motion of the vehicle whereby fuel droplets, and fuel vapor condensed into liquid, may flow via openings 170 into the intermediate chamber 162, to collect in the lower portion of the cylindrical sleeve 160. Then, upon downward displacement of the sealing mass 174 (FIG. 11B) pressure within the intermediate chamber 162 increases, forcing the seat of the mushroom-type valve 168 to deform into its open position, allowing the liquid fuel to discharge through openings 166 into the fuel tank 12.

It is appreciated that displacement of the sealing mass 174 in an upward direction will cause the seal of the mushroom-type valve 168 to return to its normally closed position, preventing ingress of liquid fuel and vapor into the intermediate chamber 162 and into the liquid trap.

Figure 12A:
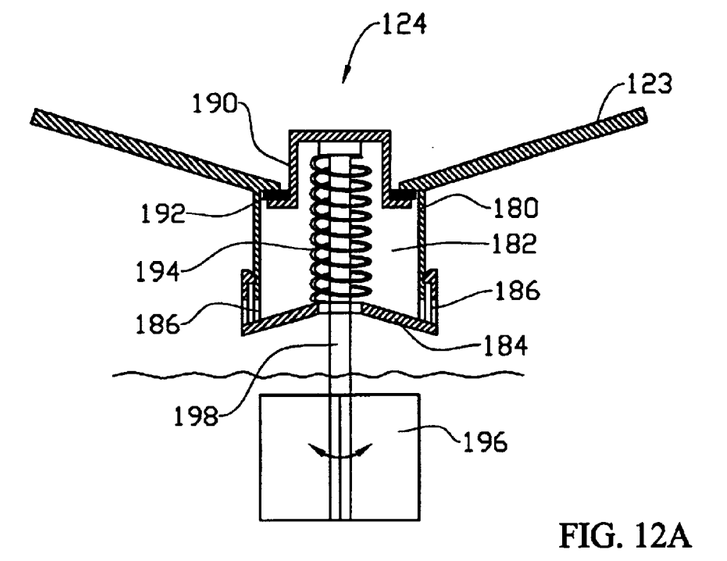
FIGS. 12A and 12B are a longitudinal section through a bottom portion of a discharging outlet fitted with a pendulum mechanism, in a closed position and in a open position, respectively.
Figure 12B:
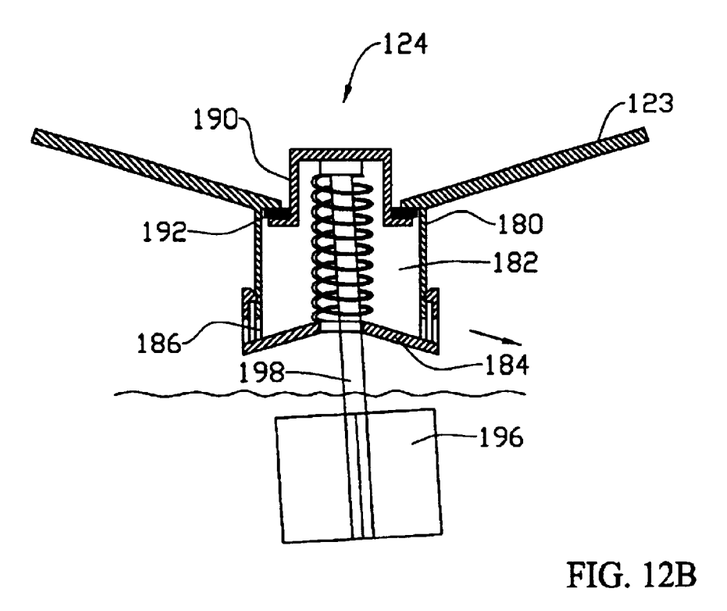
Figure 13A:
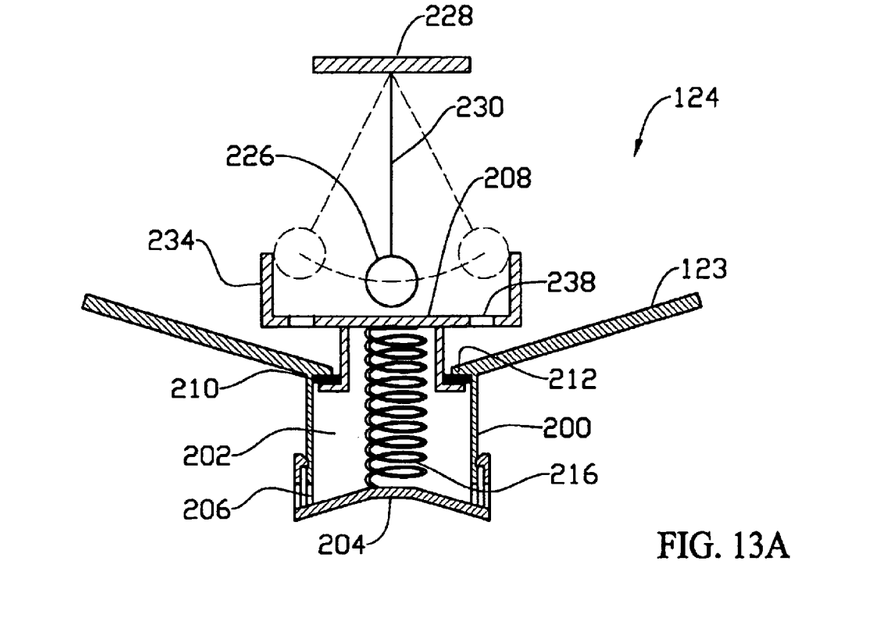
FIGS. 13A and 13B are a longitudinal section through a bottom portion of a discharging outlet fitted with a suspended pendulum mechanism, in a closed position and in a open position, respectively.
Figure 13B:
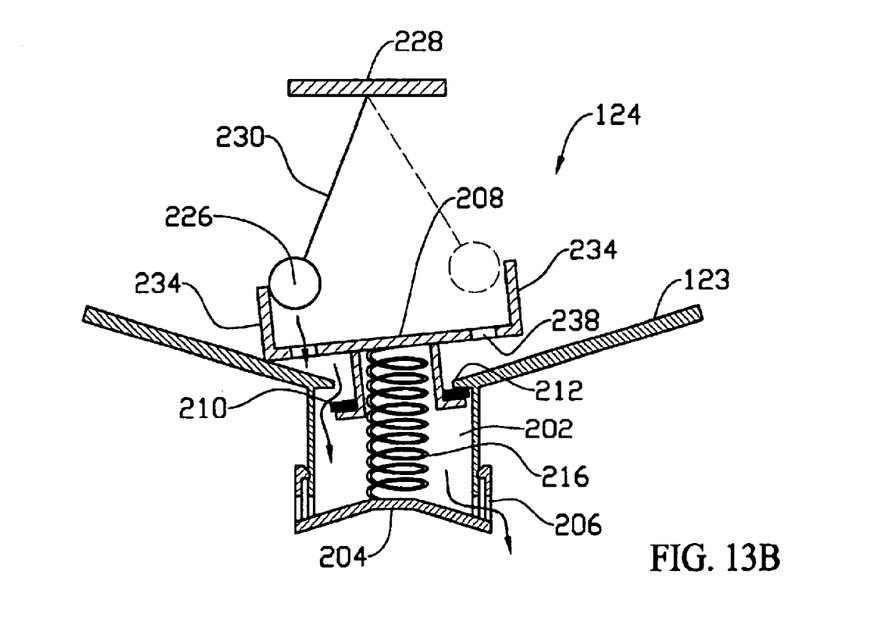

Embodiments of FIGS. 12 and 13 illustrate a slightly different concept involving a pendulum mechanism responsive to acceleration and deceleration of the vehicle.

Turning first to FIGS. 12A and 12B, there is illustrated a bottom portion of the confined space 124 of a liquid trap wherein at a lowermost portion of the bottom surface 123 there is fitted a cylindric extension 180 defining an intermediate chamber 182 extending between a bottom wall 184 having discharge openings 186, and an upper sealing member 190 fitted with a resilient sealing portion 192 and being biased into sealing engagement by means of coiled spring 194. Depending from sealing member 190 there is a floating suspended mass 196 suspended into the fuel talk 12 and coupled via a rigid rod 198 to the sealing member 190.

At the normal state of the system, i.e. when the vehicle is still, liquid fuel will collect within the confined space 124 above the bottom surface 123 as in FIG. 12A. However, upon acceleration or deceleration of the vehicle, the floating mass 196 displaces and entails corresponding displacement of the sealing member 190 into the position of FIG. 12B, hereby opening a flow path for liquid fuel to flow into the intermediate chamber 182 which can then flow via outlets 196 into the fuel tank 12, draining the liquid trap.

When the mass 196 and rod 198 are in their vertical, resting position of FIG. 12A, the flow path between the confined space 124 and the intermediate chamber 182 seals to thereby prevent flow in the direction from the fuel tank towards the canister.

The embodiment FIGS. 13A and 13B operates by the same physical principle, wherein the confined space 124 of the liquid trap is fitted at a lowermost portion of its bottom surface 123 with a draining cylindrical tube 200 downwardly extending into the fuel tank 12.

An intermediate chamber 202 is defined by the tube 200, and at its lower end by a bottom wall 204 having discharge openings 206 allowing communication between the intermediate chamber 202 and the fuel tank 12. An upper end of the intermediate chamber 202 is fitted with a sealing member 208 fitted with a sealing portion 210 sealingly engageable with a boundary sealing rim 212 defining between them a flow path extending between the confined space 124 and the intermediate chamber 202 (FIG. 13B). The sealing member 208 is biased into its normally sealing position as in FIG. 13A by means of a coiled spring member 216 bearing at its bottom end against the wall 204, however, enabling the sealing member 208 to tilt about an axis thereof, as will be explained hereinafter. A pendulum mass 226 depends from a fixed wall portion 228 of the fuel trap by means of a suspending member 230 (rigid rod or flexible cord), the length of which being calculated to allow the pendulum mass 226 to bounce between the vertically extending walls 234 of the sealing member 208.

The arrangement is such that when the vehicle is at rest (or at constant acceleration), the pendulum mass 226 is in its vertical position as in FIG. 13A and the sealing member 208 in its normally sealing position wherein the flow path between the confined space 124 and the intermediate chamber 202 is sealed, resulting in collecting of liquid fuel within the confined space 124, above the flow path. However, upon acceleration or deceleration of the vehicle, the mass 226 displaces and bounces against the vertical walls 234 of the sealing member 208, causing the sealing member 208 (FIG. 13B) to tilt thereby opening the flow path between the confined space 124 and the intermediate chamber 202, discharging the liquid fuel into the intermediate chamber and from there, via discharge openings 206 into the fuel tank 12.

It is further noticeable that the sealing member 208, whose upper portion has a cup-like shape, is fitted with openings 238 to prevent liquid fuel from collecting therein.

Figure 14A:
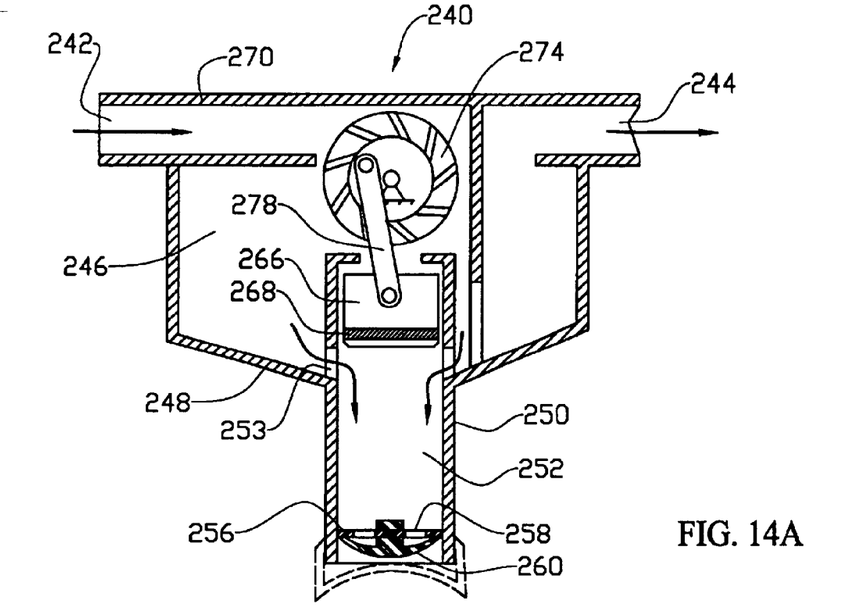
FIGS. 14A and 14B are a longitudinal section through a bottom portion of a discharging outlet in accordance with an alternative embodiment of the invention fitted with a turbine activated valving means, in a closed position and an open position, respectively.
Figure 14B:
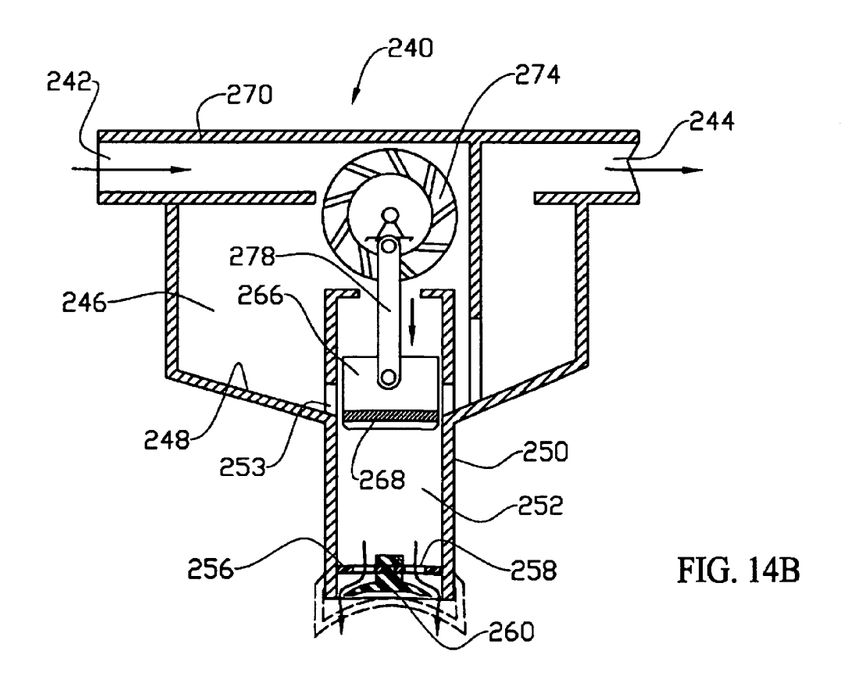

The embodiment depicted in FIGS. 14A and 14B is of a somewhat different concept. For the sake of clarification, a liquid trap 240 is schematically illustrated and comprises an inlet port 242 (connected to the different valves as described in connection with FIGS. 1 to 4) and an outlet port 244 for coupling to the canister (not shown) by suitable connecting piping. The liquid trap 240 is formed with a confined space 246 having a bottom wall 248 inclined so as to ensure collecting of liquid fuel at a lowermost portion thereof Extending from said lowermost portion there is a tubular portion 250 extending between the confined space 246 and the fuel tank 12. Defined within the tubular portion 250 there is an intermediate chamber 252 having at its lower end a bottom wall 256 formed with discharge openings 258 and fitted with a mushroom-type sealing member 260 and fitted with a sealing piston 266 therein having a sealing portion 268 and being axially displaceable within the tubular portion 250. The piston 266 is axially displaceable between an upper, open position (FIG. 14A) wherein a flow path via inlets 253 is open to facilitate flow communication between the confined space 246 and the intermediate chamber 252 and a lower position (FIG. 14B) wherein the sealing portion 268 of the piston 266 is below the inlets 253, thereby sealing the flow path between the confined space 246 and the intermediate chamber 252.

The liquid trap 240 is fitted with a flow tunnel 270 extending from the inlet port 242 and being dimensioned so as to ensure proper fluid flow therethrough. Located at an opposite end of tunnel 270 there is an impeller 274 rotatably secured within the liquid trap 240 and fitted with a crank 278 linked to the sealing piston 266. The arrangement is such that rotation of the impeller 274, under influence of fluid flow through tunnel 270 rotates the impeller 274 resulting in axial reciprocation of piston 266 between the upper, open position of FIG. 14A and the lower, closed position of FIG. 14B.

The arrangement is such that when the piston 266 is at its lower position of FIG. 14B, liquid fuel collects above the inlets 253 and when the piston 266 displaces into its open position the liquid fuel flows into the intermediate chamber 252. Upon a further downward stroke of piston 266, the mushroom sealing member 260 deforms to open (FIG. 14B) resulting in the discharge of the liquid fuel into the fuel tank 12.

Here again, it is noticeable that fluid flow in the direction from the fuel tank towards the canister is prohibited.

Figure 15A:
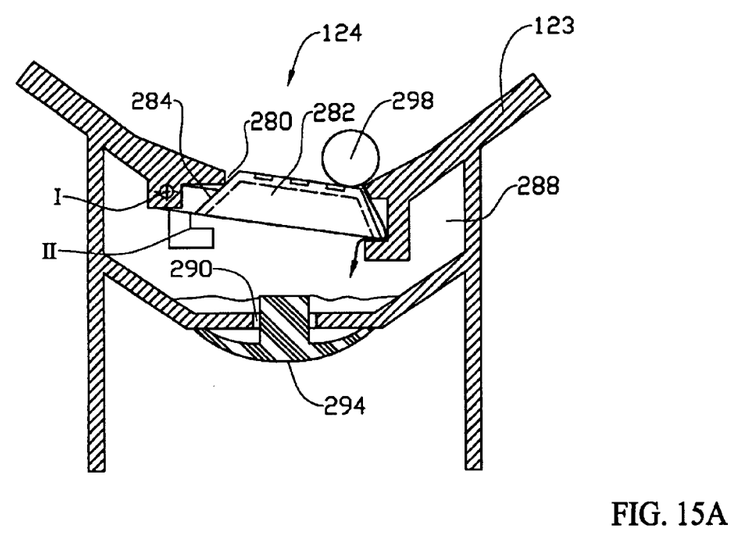
FIGS. 15A and 15B are a longitudinal section through a bottom portion of a discharging outlet in accordance with another embodiment of the invention, in a closed position and in an open position, respectively.
Figure 15B:
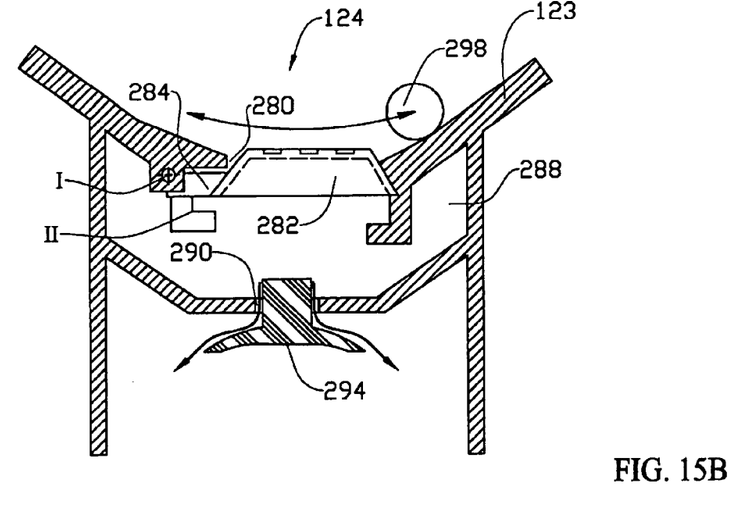

In the embodiment depicted in FIGS. 15A and 15B, the liquid trap comprises a confined space 124 with a bottom surface 123 inclined to a lowermost portion fitted with an outlet opening 280 sealable by a door-type sealing member 282 normally biased into sealing engagement by a leaf-type spring 284. Optionally, a resilient coating is provided over sealing member 282 to ensure tight sealing of the discharge opening 280. An intermediate clamber 288 is formed below the discharge outlet 280 with discharge openings 290 sealable by a normally closed mushroom-type sealing member 294. Loosely received within the confined space 124 there is a steel ball 298 which upon acceleration and deceleration of the vehicle will spontaneously displace within the space 124 occasionally displacing the sealing member 282 into its open position (FIG. 15A).

The arrangement is such that when the sealing member 282 is in its closed position (FIG. 15B) liquid fuel will collect within the confined space 124. Upon displacement of ball 298 over the sealing member 282 it will open (FIG. 15A) allowing liquid fuel to flow into the intermediate chamber 288 where it will collect until sufficient liquid mass will cause deformation of the mushroom-type sealing member 294 allowing collected liquid fuel to discharge via discharge openings 290 into the fuel tank.

Again, in accordance with this embodiment, it is clear that fluid flow in the direction from the fuel tank towards the canister is prohibited.

It is well appreciated that mushroom-type valves (also referred to as mushroom-type sealing members) are in face one-way valves.

Figure 16A:
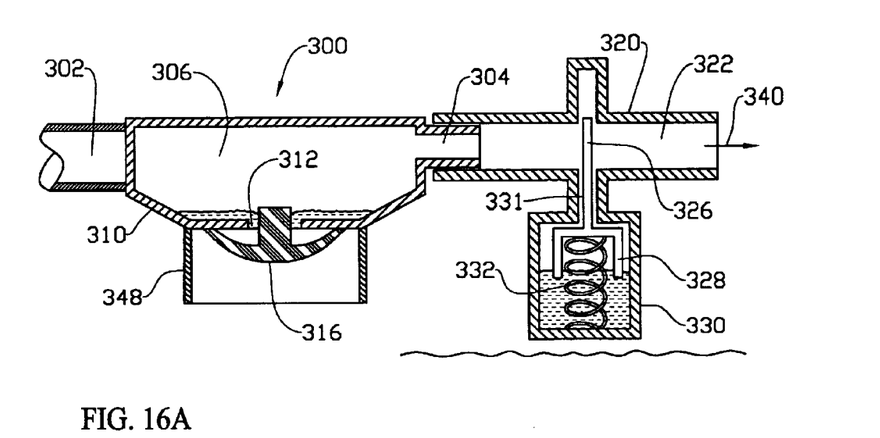
FIGS. 16A and 16B are sectional views through a liquid trap in accordance with a variation of the invention, in a closed position and in an open position, respectively.
Figure 16B:
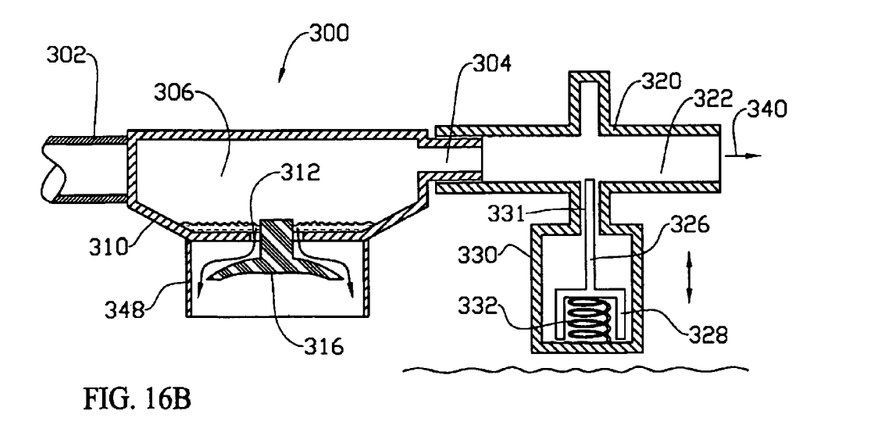

Turning now to FIGS. 16A and 16B, there is illustrated another modification of the invention which again, has the purpose of preventing flow in liquid form toward the canister.

In accordance with this embodiment, there is provided a liquid trap schematically illustrated and generally designated 300 having an inlet port 302 coupled to suitable tank valves as discussed hereinbefore and an outlet 304. A confined space 306 of the liquid trap 300 is formed with an inclined bottom wall 310 formed with discharge outlet openings 312 fitted with a mushroom-type seal 316 normally closed and acting as a one-way valve.

Coupled to the outlet port 304 there is provided a gate member 320 formed with a flow path 322 scalable by a plunger-like member 326 protruding into the flow path 322 and being connected to a float member 328 received within a housing 330 via apertures 331 and being supported by a weak spring 332 such that the flow path 322 is normally sealed by means of plunger 326, as in the position of FIG. 16A. However, upon displacement of the vehicle, under influence of waves within the fuel tank, the float member 328 vertically displaces reciprocating between its closed position (FIG. 16A) and an open position (FIG. 16B) the latter facilitating fluid flow towards the canister in the direction of arrow 340.

The arrangement is such that liquid fuel accumulates within the liquid trap 300 and will discharge through discharge openings 312 upon accumulation of a sufficient amount of liquid fuel which will deform the mushroom-type seal 316 (FIG. 16B) discharging into the fuel tank 12. The liquid fuel is prevented from flowing towards the canister by means of plunger 326 while in its closed position (FIG. 16A) though fuel vapor is free to flow through path 322 when the plunger 316 is in its open position (FIG. 16B)

It is further appreciated that in any of the previous embodiments the discharge outlets 312 into the fuel tank 12 may be fitted with protective walls, e.g. surrounding walls 348 illustrated in FIG. 16A, to thereby prevent liquid waves within the fuel tank from influencing the normal operation of the one-way mushroom-type sea) 316.

Figure 17A:
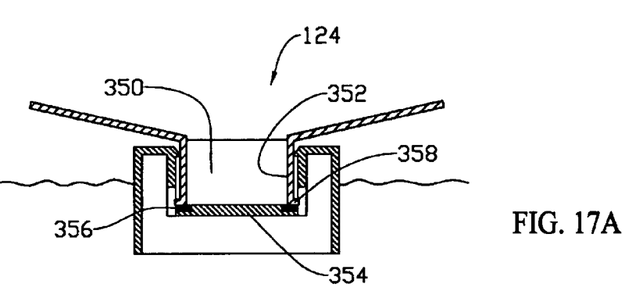
FIGS. 17A and 17B are a longitudinal section through the bottom portion of a discharging outlet in accordance with still another embodiment of the invention, in a closed position and in an open position, respectively.
Figure 17B:
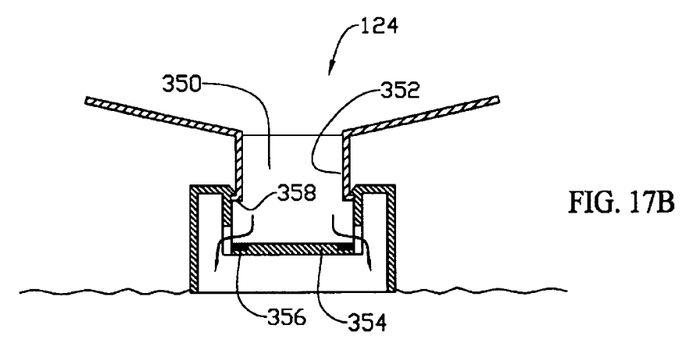

The embodiment of FIGS. 17A and 17B illustrates a passive-type closure arrangement for a liquid trap in accordance with the invention, suitable for displacement according to any of the solutions illustrated in FIGS. 5 to 7.

In this embodiment, the confined space 124 of the liquid trap is fitted with a discharge outlet 350 fitted with a discharge neck 352 and sealable by a float-type sealing member 354 fitted with a resilient sealing portion 356 fitted for sealing engagement with an annular rim 358 of a discharge neck 352.

The sealing member 354 is a float member displaceable between a closed position (FIG. 17A) and an open position (FIG. 17B).

The arrangement is such that in the closed position of FIG. 17A, liquid file accumulates over the sealing member 354 wherein discharge outlet 350 remains sealed owing to buoyancy imparted to the sealing member 354 by fuel level within the fuel tank 12. However, upon decrease of fuel level within the tank 12 or as the vehicle moves and waves occur within the fuel tank, the sealing member 354 displaces into its open position (FIG. 17B) discharging the liquid into the fuel tank.

Figure 18:
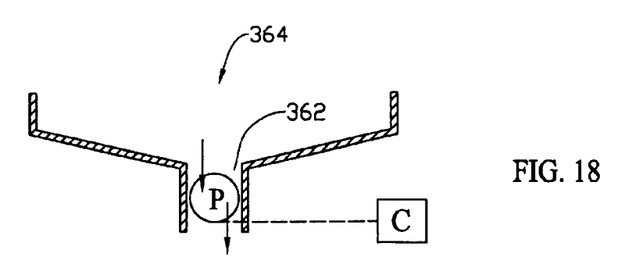
FIG. 18 is a schematic representation of a bottom portion of a discharging outlet in accordance with still another embodiment of the invention.

Turning now to FIG. 18 there is illustrated a different concept of the invention wherein the liquid trap is formed with a discharge outlet 362 disposed between the confined space 364 of the liquid trap and the fuel tank 12, said discharge outlet being fitted with an electronic low flow rate pump P ensuring flow only in the direction toward the fuel tank 12 and being controlled by control unit C. The control unit may be programmed to generate a continuous operating signal for the pump P or intermediate such signals which may be time dependent, pressure dependent, dependent upon fuel level within the tank, etc.

What is claimed is:

1. A liquid fuel trap device for a vehicle fuel tank, the device comprising a housing forming a confined space with at least one inlet port connectable to a corresponding at least one fuel valve, an outlet port connectable to a fuel vapor recovery system, and a liquid fuel discharge valve adapted for discharging liquid fuel from said space into the tank, the housing further comprising a connecting arrangement for attaching the device on an inner surface of an upper wall of the fuel tank.

2. A liquid fuel trap device according to claim 1, wherein the housing is formed of at least two members formed by an injection molding process, welded to one another.

3. A liquid fuel trap device according to claim 1, wherein the at least one inlet port extends below the outlet port.

4. A liquid fuel trap device according to claim 1, wherein the housing is formed with an expansion chamber to allow fuel vapor expansion and accumulation of liquid fuel therein.

5. A liquid fuel trap device according to claim 4, wherein the expansion chamber is sized so as to significantly reduce flow velocity of the fuel fluid entering the device via the at least one inlet port.

6. A liquid fuel trap device according to claim 1, wherein the housing is formed with a well portion at a lowermost portion of the housing, the discharge valve being fitted at said well portion of the housing.

7. A liquid fuel trap device according to claim 1, wherein the at least one inlet port and the outlet port are fitted with a connection nipple connectable to a tube, said connecting nipples being integrally formed with the housing.

8. A liquid fuel trap device according to claim 1, wherein liquid fuel is discharged form the space into the fuel tank through the discharge valve, by gravity force.

9. A liquid fuel trap according to claim 8, wherein the discharge valve is a mushroom-type check valve.

10. A liquid fuel trap according to claim 8, wherein the discharge valve is a spring biased type check valve.

11. A liquid fuel trap according to claim 1, wherein the outlet port is formed above the at least one inlet port, so as to prevent liquid splash thereto.

12. A liquid fuel trap according to claim 1, wherein intermediate the inlet port and the outlet port there is formed a barrier wall, so as to prevent liquid splash thereto.

13. A liquid fuel trap according to claim 1, wherein the housing of the liquid fuel trap device is snappingly attached to the wall of the fuel tank.

14. A liquid fuel trap according to claim 1, wherein the discharge valve seals upon pressure rise within the fuel tank.

15. A liquid fuel trap according to claim 1, wherein the discharge valve is a roll over valve.

16. A liquid trap according to claim 15, wherein the discharge valve seals upon liquid rise within the fuel tank, beyond a sealing level of the roll over valve.

17. A liquid fuel trap according to claim 15, wherein the roll over valve comprises a casing fitted with a fluid inlet being in flow communication with the fuel tank, and a fluid outlet in flow communication with the confined space, said fluid outlet comprising a substantially elongated slit-like outlet aperture; a valve seating bounding said outlet aperture; a float member located in said casing and axially displaceable within said casing between said inlet and said outlet; an elongated flexible closure membrane strip anchored at one end thereof to an end of said float member adjacent said outlet and at a portion thereof offset with respect to said outlet; spring biasing means located within said casing and bearing on said float member so as to bias it in the direction of said outlet.

18. A liquid fuel trap according to claim 17, wherein said spring biasing means together with buoyancy forces acting on said float member tend to press said membrane strip into sealing engagement with said outlet aperture whilst gravity forces acting on said float member tend to displace said float member away from said outlet so as to progressively detach said strip from sealing engagement with said outlet.

19. A fuel system comprising a fuel tank, at least one fuel valve, a fuel recovery device and a liquid fuel trap device extending between the at least one fuel valve and the fuel recovery device, said liquid trap device comprising a housing forming a confined space with at least one inlet port connectable to the corresponding at least one fuel valve, an outlet port connectable to the fuel vapor recovery system, a liquid fuel discharge valve adapted for discharging liquid fuel from said space into the tank, and a connecting arrangement for attaching the device on an inner surface of an upper wall of the fuel tank.

20. A fuel system according to claim 19, wherein the discharge valve is located at a well portion of the housing formed at a lowermost portion of the housing, for discharging liquid fuel into the tank by gravity.

21. A fuel system according to claim 19, wherein the outlet port is formed above the at least one inlet port, so as to prevent liquid splash thereto.

22. A fuel system according to claim 19, wherein intermediate the inlet port and the outlet port there is formed a barrier wall, so as to prevent liquid splash thereto.

23. A fuel system according to claim 19, wherein the housing of the liquid fuel trap device is snappingly attached to the wall of the fuel tank.

24. A fuel system according to claim 19, wherein the discharge valve seals upon pressure rise within the fuel tank.

25. A liquid fuel trap according to claim 19, wherein the discharge valve is a roll over valve.

26. A liquid trap according to claim 25, wherein the discharge valve seals upon liquid rise within the fuel tank, beyond a sealing level of the roll over valve.

27. A liquid fuel trap according to claim 25, wherein the roll over valve comprises a casing fitted with a fluid inlet being in flow communication with the fuel tank, and a fluid outlet in flow communication with the confined space, said fluid outlet comprising a substantially elongated slit-like outlet aperture; a valve seating bounding said outlet aperture; a float member located in said casing and axially displaceable within said casing between said inlet and said outlet; an elongated flexible closure membrane strip anchored at one end thereof to an end of said float member adjacent said outlet and at a portion thereof offset with respect to said outlet; spring biasing means located within said casing and bearing on said float member so as to bias it in the direction of said outlet.

28. A liquid fuel trap according to claim 27, wherein said spring biasing means together with buoyancy forces acting on said float member tend to press said membrane strip into sealing engagement with said outlet aperture whilst gravity forces acting on said float member tend to displace said float member away from said outlet so as to progressively detach said strip from sealing engagement with said outlet.

29. A liquid fuel trap for a vehicle fuel tank, said fuel trap comprising a housing fitted for attaching on an inner surface of an upper wall of the fuel tank, said housing being formed with a confined space, said housing further comprising at least one inlet port connectable to corresponding at least one fuel valve, an outlet port connectable to a fuel vapor recovery system and a liquid fuel discharge arrangement for discharging liquid fuel into the fuel tank and preventing liquid flow in reverse direction, said liquid fuel discharge arrangement comprising an inlet, which is in communication with the confined space, a discharge outlet which is in communication with the fuel tank, and an intermediate chamber extending between the inlet and the discharge outlet, wherein said discharge arrangement is adapted for selectively discharging a either the confined space or the intermediate chamber into the fuel tank.

30. A liquid fuel trap according to claim 29, wherein the inlet of the discharge arrangement is fitted with a normally closed valve ensuring flow of the liquid fuel only towards the fuel tank and said discharge arrangement is further provided with a sealing member which is axially displaceable within the intermediate chamber between an open position to discharge said intermediate chamber into the fuel tank and a sealed position, sealing said intermediate chamber.

31. A liquid fuel trap according to claim 30, wherein said sealing member is a float fitted with a sealing rim sealingly displaceable against inner walls of the intermediate chamber.

32. A liquid fuel trap according to claim 30, wherein said valve is a mushroom-type one way valve.

33. A liquid fuel trap according to claim 29, wherein an upper portion of the intermediate chamber is fitted with inlet openings extending into said confined space and being sealable by an axially displaceable sealing member being normally biased into an open position and reciprocal into a closed position; said discharge outlet being a one-way sealing member to ensure liquid flow in the direction from said intermediate chamber to said fuel tank.

34. A liquid fuel trap according to claim 33, wherein said one-way valve is a mushroom-type valve.

35. A liquid fuel trap according to claim 33, wherein said sealing member is a spring biased mass, biased by a coiled spring extending within said intermediate chamber.

36. A liquid fuel trap according to claim 35, wherein said mass is fitted with a sealing portion sealingly displaceable against an inner wall of the intermediate chamber.

37. A liquid fuel trap according to claim 35, wherein downward displacement of said mass gives rise to pressure increase within the intermediate chamber entailing opening of the discharge outlet sealing valve.

38. A liquid fuel trap according to claim 29, wherein the inlet port is fitted with a closing member tiltable into an open position by means of a mass suspended therefrom into the fuel tank, whereby acceleration applied to said mass entails displacement of the sealing member into an open position allowing liquid flow from the confined space into the intermediate chamber.

39. A liquid fuel trap according to claim 38, wherein said sealing member is spring biased into a normally closed position.

40. A liquid fuel trap according to claim 39, wherein said sealing member is fitted with an annular resilient sealing member for sealing engagement with the inlet port.

41. A liquid fuel trap according to claim 38, wherein the mass is coupled by a rigid connecting member to said sealing member.

42. A liquid fuel trap according to claim 29, wherein the inlet port is fitted with a closing member tiltable into an open position by means of a suspended mass impinging against a portion of the sealing member, whereby acceleration applied to said mass entails displacement of the sealing member into an open position allowing liquid flow from the confined space into the intermediate chamber.

43. A liquid fuel trap according to claim 42, wherein the mass is suspended within the confined space.

44. A liquid fuel trap according to claim 43, wherein the mass impinges against a wall portion of the sealing member projecting into said confined space.

45. A liquid fuel trap according to claim 43, wherein said sealing member is spring biased into a normally closed position.

46. A liquid fuel trap according to claim 29, wherein the inlet of the discharge arrangement is located at a lowermost portion of a bottom surface of the confined space.

47. A liquid fuel trap according to claim 29, wherein an upper portion of the intermediate chamber is fitted with inlet openings extending into said confined space and being sealable by a sealing member axially reciprocating between an open position and a closed position; said discharge outlet being a one-way sealing member to ensure liquid flow in the direction from said intermediate chamber to said fuel tank.

48. A liquid fuel trap according to claim 47, wherein said sealing member is axially reciprocal by an impeller member fitted within the confined space and being linked to the sealing member by a crank rod; said impeller member extending opposite a fluid flow duct extending from an inlet port of said housing and being rotatable by fluid flow through said flow duct.

49. A liquid fuel trap according to claim 29, wherein the inlet part is fitted with a one-way door-type closing member tiltable into an open position by means of a loose mass displaceable within the confined space, whereby displacement of the sealing member into an open position allowing liquid flow from the confined space into the intermediate chamber and where said discharge outlet of the confined space is fitted with a one-way sealing member to ensure liquid flow in the direction from said intermediate chamber to said fuel tank.

50. A liquid fuel trap according to claim 49, wherein the loose mass is a spherical mass displaceable within the confined space owing to acceleration forces imparted thereto.

51. A liquid fuel trap according to claim 49, wherein the one-way door-type closing member is spring biased into a closed position.

52. A liquid fuel trap according to claim 29, wherein the discharge outlet is fitted with a one way mushroom type valve deformable into an open position by means of liquid fuel mass applied there over.

53. A liquid fuel trap according to claim 29, fitted with a flow control device extending between the outlet port of the housing and coupled with the vapor recovery system, said flow control device comprising a gate for selectively shutting a flow path therewithin responsive to fuel level within the fuel tank.

54. A liquid fuel trap according to claim 53, wherein the gate comprises a plunger slidingly engageable within a sealing portion of the flow path and being associated with a float member received within the fuel tank.

55. A liquid fuel trap according to claim 54, the float member is spring biased.

\* \* \* \* \*